United States Patent [19]
Patterson

[11] 3,890,251
[45] June 17, 1975

[54] SEMICONDUCTIVE OXIDES
[75] Inventor: Frank Knowles Patterson, Wilmington, Del.
[73] Assignee: E. I. du Pont de Nemours & Company, Wilmington, Del.
[22] Filed: Oct. 15, 1973
[21] Appl. No.: 406,303

[52] U.S. Cl. .................. 252/519; 252/520; 423/633
[51] Int. Cl. ............................................. H01b 1/08
[58] Field of Search................... 252/518, 519, 520; 423/633

[56] References Cited
UNITED STATES PATENTS
2,590,894  4/1952  Sanborn............................. 252/520
3,515,686  6/1970  Bowman............................ 252/518
3,560,410  2/1971  Schubert........................... 252/518

FOREIGN PATENTS OR APPLICATIONS
27,555  8/1973  Japan

Primary Examiner—Maynard R. Wilbur
Assistant Examiner—S. C. Suczinski

[57] ABSTRACT

Semiconducting oxides of the formula $Fe_{2-x}Ge_xO_3$ and shaped thermistor bodies comprising such oxides.

8 Claims, 2 Drawing Figures

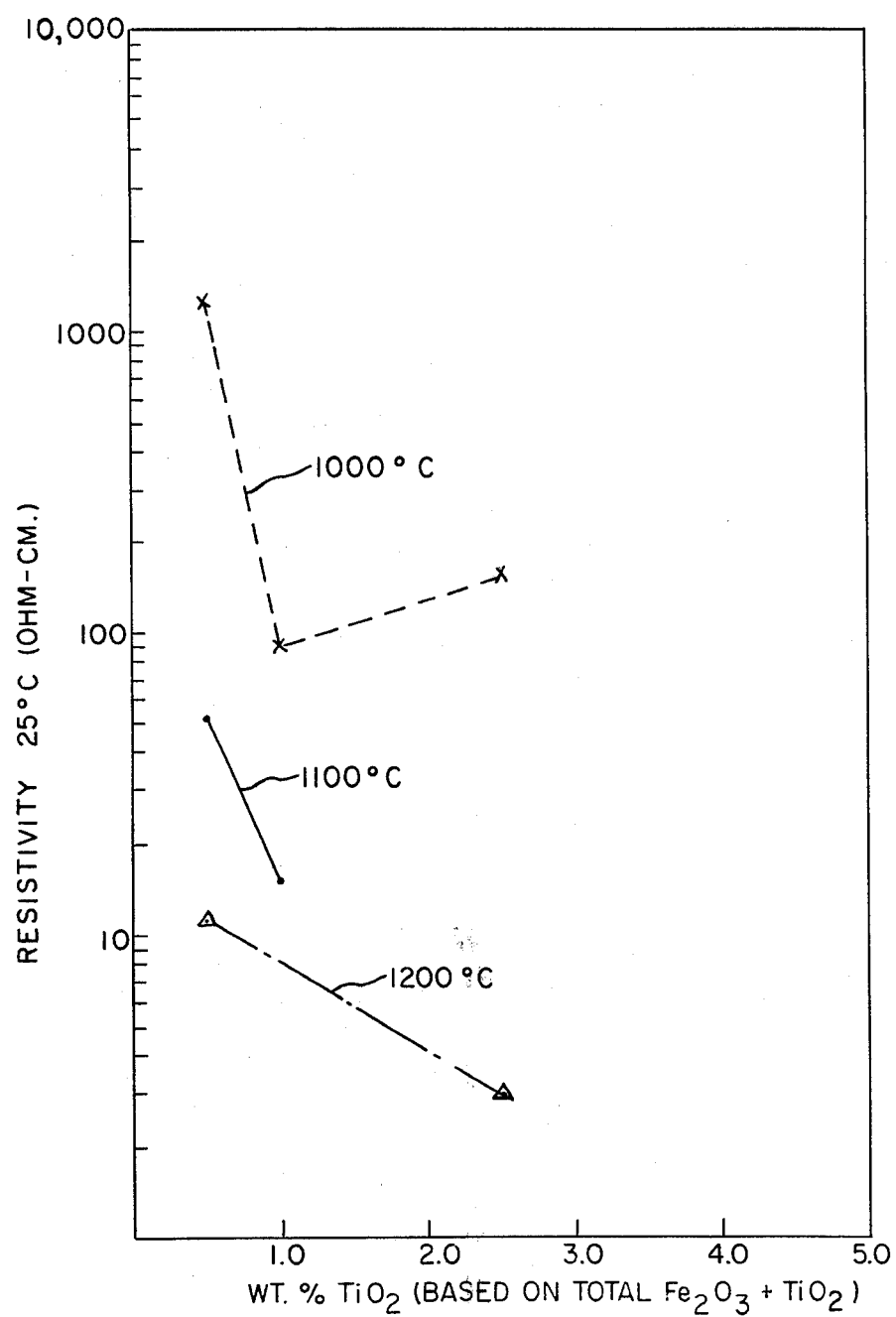

SEMICONDUCTIVE OXIDES

BACKGROUND OF THE INVENTION

This invention relates to novel metal oxides, and, more particularly, to semiconductive iron oxides useful as thermistors.

Thermistors are semiconductors exhibiting large variations of resistance with temperature, that is, a large temperature coefficient of resistance (TCR). When the resistance varies negatively with temperature, the thermistor is said to have a negative TCR; when the resistance varies positively with temperature, the thermistor is said to have a positive TCR. There exists a need for negative TCR thermistors and compositions for producing the same.

The applications for NTC (negative temperature coefficient) thermistors are principally temperature sensing, environmental sensing, current control and power. Most of the materials presently used for NTC thermistors are based on the principle of controlled valency of semiconducting oxides. It is thought that the condition for electrical conductivity in these semiconductors is that the lattice network contains ions of different valency on the same crystallographic site. This is achieved by the incorporation into the lattice of foreign ions of such a charge that they balance the charge of the ions of deviating valency.

Currently used thermistor materials include such semiconducting oxides as spinels, having 3 metal ions per four oxygen ions ($Me_3O_4$), typically $Ni_{1-u}{}^{+2}Cu_u{}^{+1}Mn_u{}^{+4}Mn_{2-u}{}^{+3}O_4$; doped NiO such as $Li_yNi_{1-2y}{}^{+2}Ni_y{}^{+3}O$; and oxides with the alpha-$Fe_2O_3$ structure such as $Fe_{2-x}{}^{+3}Fe_{x/2}{}^{+2}Me_{x/2}{}^{+4}O_3$ (Me is Ti; see E. J. W. Verwey, Philips Res. Rep. 5, 173–187, at 183, 1950).

Fabrication of the aforementioned materials for thermistor applications generally involves admixing the appropriate reagents, which are then pressed to the desired configuration and thereafter sintered in a furnace at temperatures of 1200°–1450°C., to achieve compound formation and proper oxidation states.

In the firing step for the spinels and doped NiO, careful control of the furnace atmosphere is critical to maintain the ions in their proper oxidation state. Compositions based on the alpha-$Fe_2O_3$ structure, e.g., $Fe_{2-x}Ti_xO_3$, although not as sensitive to the furnace atmosphere, require high temperatures (e.g., 1260°C.) to complete reaction and achieve the proper resistivity; when these compositions are fired at lower temperatures, the reaction does not go to completion, and thus the resistivity of the composition can vary as a function of subsequent processing temperature to form shaped thermistors. Sanborn U.S. Pat. No. 2,590,894, issued Apr. 1, 1952, describes the $Fe_{2-x}Ti_xO_3$ compounds and their preparation; e.g., 2300°F. or 1260°C. was used at col. 2, line 30.

SUMMARY OF THE INVENTION

I have invented a novel composition of matter useful as a thermistor. The novel composition of matter is semiconductive oxides of the hexagonal alpha-$Fe_2O_3$ crystalline structure having the formula $Fe_{2-x}Ge_xO_3$; $x$ is in the range 0.0001–0.05. Optimum $x$ for lowest resistivity is about 0.05, since this seems to be the maximum amount of $GeO_2$ which can be inserted into the alpha-$Fe_2O_3$ lattice. Stated another way, the novel oxide may be made by heating together 0.01–10% $GeO_2$ and 90–99.99% $Fe_2O_3$ (10% $GeO_2$ would correspond to an "$x$" of 0.156 if reaction went that far), preferably 0.01–5% $GeO_2$ and 95–99.99% $Fe_2O_3$. The optimum weight percent of $GeO_2$, for obtaining lowest resistivity, is about 3.24%, which corresponds to the maximum amount of $GeO_2$ which can be inserted into the $Fe_2O_3$ lattice ($x = 0.05$). These oxides have a negative temperature coefficient of resistance, as described above.

These novel oxides offer the distinct advantage of having lower synthesis temperatures than some other doped iron oxides, such as Ti-doped iron oxide. They are also relatively insensitive over broader thermal processing range than are the $Fe_2O_3/TiO_2$ systems.

Also a part of this invention are electrically conductive shaped ceramic bodies having a negative TCR (e.g., thermistors) of such novel oxides and such bodies which comprise, in addition to the novel semiconducting oxides $Fe_{2-x}Ge_xO_3$, unreacted excess $GeO_2$, in the latter case, the total $GeO_2$ present, as unreacted $GeO_2$ and/or as part of $Fe_{2-x}Ge_xO_3$, is up to about 10 weight percent, based on the total weight of the $Fe_{2-x}Ge_xO_3$ and $GeO_2$ present. The 10% upper limitation is chosen for practical reasons, such as obtaining reproducible thermistors, it being understood that it may be possible to employ more than 10% $GeO_2$ but still obtain thermistor behavior. Preferred bodies comprise up to 5% $GeO_2$, on the same basis.

BRIEF DESCRIPTION OF THE DRAWING

In the drawing,

FIG. 2 is the same for $Fe_2O_3/TiO_2$ systems, illustrating the remarkably greater temperature sensitivity of such oxides versus those of the present invention.

DETAILED DESCRIPTION

Figure 1:
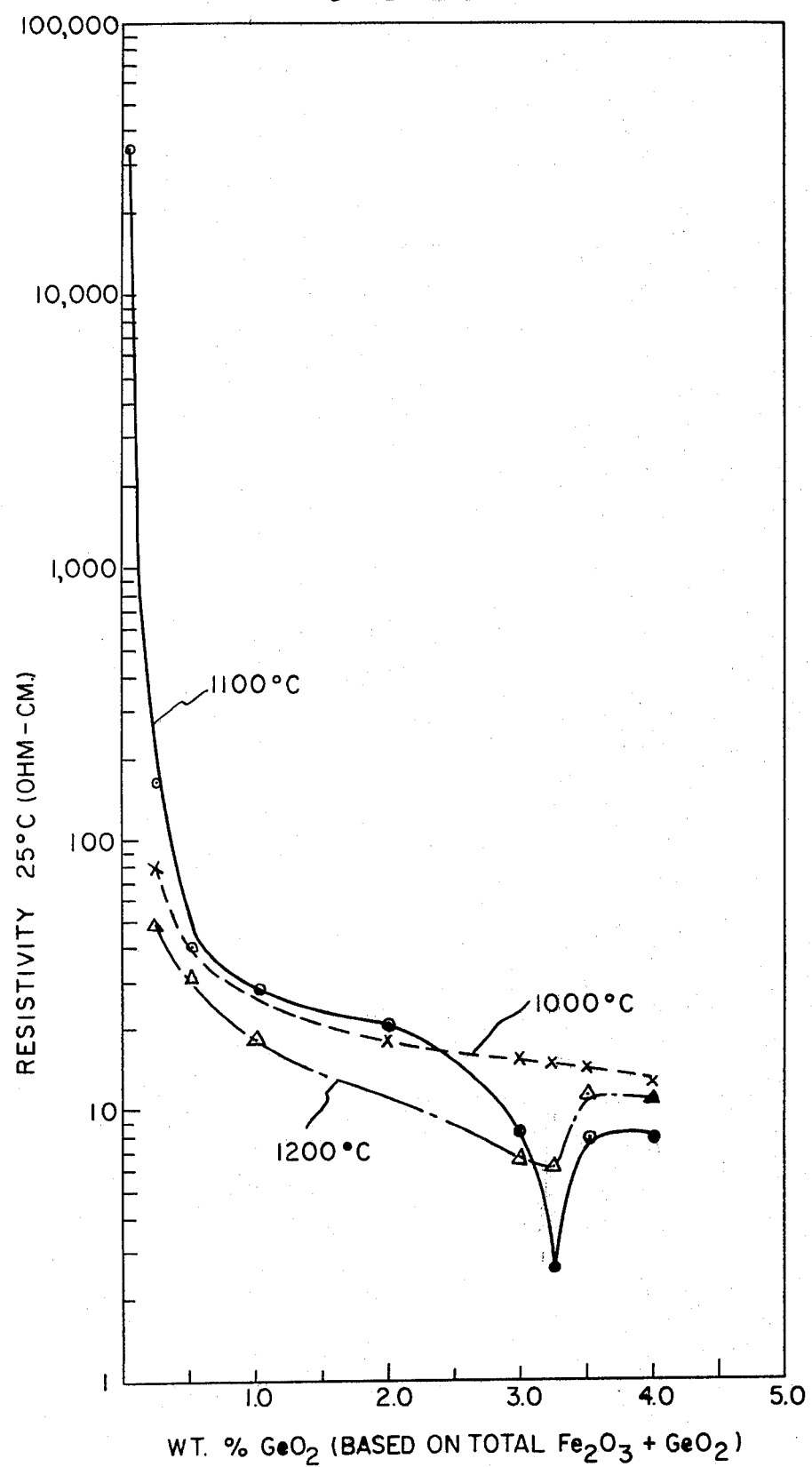
FIG. 1 is a plot of sensitivity versus $GeO_2$ content in $Fe_2O_3/GeO_2$ systems of this invention formed at various temperatures.

Substitution of germanium ions into the crystal lattice of alpha-$Fe_2O_3$ produces semiconducting oxides which are characterized by varying resistivities and NTCR characteristics, dependent upon the amount of $GeO_2$ in the oxide. Similar characteristics can be achieved with $TiO_2$ substitution in the alpha-$Fe_2O_3$ lattice (as disclosed in U.S. Pat. No. 2,590,894); however, where $GeO_2$ is used, lower synthesis temperatures can be used (e.g., 1000°C.) and, more importantly, the resistivities of Ge-based compositions are relatively insensitive to a broader range of processing temperatures (1000°–1200°C.) than the corresponding Ti-based systems. This is shown in the comparative examples of this invention.

The oxides of the present invention may be made by firing the oxides $Fe_2O_3$ and $GeO_2$ in the desired proportions at 950°–1250°C. in air. Often, the component oxides will be milled together, pressed into a body, and cosintered (coreacted) at such temperatures, to form a thermistor body.

The Figures illustrate the relative temperature insensitivity of the oxides of the present invention, a distinct commercial advantage. Iron oxide itself is reported to have a resistivity of $10^9$ ohm-cm.

The crystalline structure of the oxides of the present invention was examined as follows. Incorporation of $GeO_2$ into the hexagonal alpha-$Fe_2O_3$ lattice by high temperature solid state synthesis techniques can be rationalized by the following molar equation:

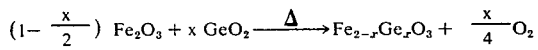

Every $Ge^{+4}$ ion incorporated into the lattice network creates an $Fe^{+2}$ to achieve electrical neutrality. This can be demonstrated by the following relationship:

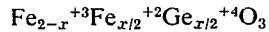

The condition for electrical conductivity in semiconductors of this type is that the lattice network contain ions of different valency on the same crystallographic sites. That $Ge^{+4}$ does substitute on the octahedral sites of the hexagonal alpha-$Fe_2O_3$ lattice, maintaining the same symmetry, is shown by x-ray powder diffraction on the reaction product of $Fe_2O_3$ with 3.24% $GeO_2$ (based on total weight of $Fe_2O_3$ and $GeO_2$) fired at 1100°C. for 48 hours. A Hagg Gunier camera using $CuK\alpha_1$ radiation was used. The powder pattern was indexed on the basis of the hexagonal alpha-$Fe_2O_3$ lattice. All reflections could be accounted for. No $GeO_2$ reflections were noted. The lattice parameters were refined by least squares techniques. The unit cell parameters of this compound are shown below and compared with the cell parameters (in angstroms) of alpha-$Fe_2O_3$ reported under ASTM Card No. 13-534:

|  | a° | c° |
|---|---|---|
| alpha-$Fe_2O_3$ | 5.0353 | 13.750 |
| $Fe_2O_3$ + 3.24% $GeO_2$ | 5.0317 | 13.737 |

EXAMPLES

The following examples illustrate the present invention. In the examples all ratios, percentages, proportions, etc., are by weight.

$Fe_{2-x}Ge_xO_3$ was prepared by milling together for 18 hours 100-gram quantities of commercially available reagent grade $Fe_2O_3$ and $GeO_2$ in the desired proportions, as an aqueous slurry; one-fourth inch long zirconia cylinders were used as the grinding medium. The resultant powder mixture was dried and then compressed into cylindrical rods (0.5 cm. diameter by 0.5 cm. length), which were placed on thick Pt foil and inserted into a furnace preheated to 800°C. The temperature was then raised to the desired reaction temperature (either 1000°C., 1100°C. or 1200°C. in three series of experiments) and held there for 48 hours. The resultant product was then quenched in air. For comparative purposes, $Fe_{2-x}Ti_xO_3$ was similarly prepared.

Table I indicates resistivity data for various oxides of this invention when formed at 1000°C., 1100°C. or 1200°C., respectively.

TABLE I

RESISTIVITY FOR COMPOSITIONS OF $Fe_{2-x}Ge_xO_3$ WHEN PROCESSED AT VARIOUS TEMPERATURES

| Calculated* Value of "x" | Wt. % $GeO_2$** | Resistivity (ohm-cm.) at 25°C. Measured on Samples Fired for 48 Hours at | | |
| --- | --- | --- | --- | --- |
| | | 1000°C. | 1100°C. | 1200°C. |
| 0.0009 | 0.05 | n.d. | 34,800 | n.d. |
| 0.004 | 0.25 | 77.8 | 161 | 48.7 |
| 0.008 | 0.50 | 40 | 39.7 | 31.5 |
| 0.015 | 1.0 | n.d. | 28.3 | 18.5 |
| 0.031 | 2.0 | 18.7 | 20.9 | 26.6 |
| 0.046 | 3.0 | 15.4 | 8.4 | 6.8 |
| 0.050 | 3.24 | 14.8 | 2.6 | 6.1 |
| 0.054* | 3.5 | 14.1 | 7.9 | 11.4 |
| 0.062* | 4.0 | 12.4 | 8.0 | 11.0 |

*It is thought that the maximum amount of $GeO_2$ which can be inserted in the $Fe_2O_3$ lattice in producing $Fe_{2-x}Ge_xO_3$ corresponds to x equal to 0.05. Hence an "x" above that value corresponds to a mixture of $Fe_{2-x}Ge_xO_3$ and unreacted $GeO_2$.

**Based on total $Fe_2O_3$ and $GeO_2$ present.

The resistivity data in Table I were calculated from resistance measurements as follows. A Viking LS 232 mercury-indium-thallium alloy obtainable from Victor King Materials Lab was applied uniformly on both faces of the fired cylindrical rods. Copper disc electrodes also coated with the same alloy were pressed onto the alloy-coated rods. Tinned copper leads were soldered onto the copper discs and connected to a Triplett type 1 digital volt ohmmeter, Model 8035. Resistance readings were taken at 25°C. Resistivities were calculated in ohm-cm. using the equation:

$$R = \frac{\rho \cdot l}{A}$$

where $R$ = resistance in ohms
$\rho$ = resistivity in ohm-cm.
$l$ = length of resistor
$A$ = cross-sectional area of resistor As shown in FIG. 1, the minimum resistivity occurs at 3.24 weight percent $GeO_2$, based on the total weight of $Fe_2O_3$ and $GeO_2$, where $x$ is 0.05 in $Fe_{2-x}Ge_xO_3$. Further additions of $GeO_2$ increase the resistivity of these ceramic semiconductors. Presumably 3.24% $GeO_2$ represents the maximum concentration of $GeO_2$ that can be incorporated into the alpha-$Fe_2O_3$ lattice. Similar data were obtained for comparative purposes with the $Fe_2O_3/TiO_2$ system.

The data of Table I were used to prepare FIG. 1, a semilogarithmic plot of resistivity as a function of concentration $GeO_2$ (in weight percent), when formed at different temperatures. FIG. 2 is a similar plot of data obtained similarly on reacting $TiO_2$ with $Fe_2O_3$. From the Figures, the relative temperature insensitivity of the $Fe_2O_3/GeO_2$ system versus the $Fe_2O_3/TiO_2$ system is apparent, at similar processing temperatures.

Table II compares the resistivities and resistivity ratios of fired $Fe_2O_3/GeO_2$ and $Fe_2O_3TiO_2$ bodies at the same weight percent concentration. These data again demonstrate

TABLE II

RESISTIVITY AND RESISTIVITY RATIOS FOR $Fe_2O_3/GeO_2$ AND $Fe_2O_3/TiO_2$ AS A FUNCTION OF PROCESSING TEMPERATURE (48 HR. FIRING TIME)

| Oxides (wt.%) | x in $Fe_{2-x}Me_xO_3$ | Resistivity, 25°C. (ohm-cm.) 1000°C. | 1100°C. | 1200°C. | Ratio: Resist. (1000°C.) / Resist. (1100°C.) | Ratio: Resist. (1000°C.) / Resist. (1200°C.) |
|---|---|---|---|---|---|---|
| 99.5% $Fe_2O_3$ 0.5% $GeO_2$ | 0.008 | 40 | 39.7 | 31.5 | 1.0 | 1.3 |
| 99.5% $Fe_2O_3$ 0.5% $TiO_2$ | 0.010 | 1,300 | 52 | 11.3 | 25 | 115 | the relative insensitivity of fired $Fe_2O_3/GeO_2$ ceramic semiconductor bodies to processing temperatures when compared to $Fe_2O_3/TiO_2$ bodies.

Table III shows the NTCR characteristics of selected compositions of the invention. The coefficient of resistance is expressed as a fractional change in resistance/°C. and commonly is referred to as $\alpha$. $\alpha$ was determined from the following relationship:

$$\alpha = 1/R \frac{dR}{dT} = \frac{\beta}{T^2}$$

where $\beta$ = slope of the linear plot in R vs. $\frac{1}{T°K}$ $T = T°K$.

As seen in Table III, increasing $GeO_2$ concentration above 3.25% does not destroy the desired NTCR characteristics.

When in the present invention reference is made to excess or unreacted or free $GeO_2$, I mean $GeO_2$ which has not reacted with $Fe_2O_3$ to form the semiconductive oxide $Fe_{2-x}Ge_xO_3$; no position is taken as to whether other reaction products have formed with that excess $GeO_2$ during firing.

TABLE III

TCR CHARACTERISTICS OF $Fe_{2-x}Ge_xO_3$ COMPOSITIONS

| Composition | Calc. x* | Fired 48 Hr. at: | Resistivity ohm-cm.; 25°C. | Coef. of Resistance | %/°C. |
|---|---|---|---|---|---|
| 99.75% $Fe_2O_3$ 0.25% $GeO_2$ | 0.004 | 1100°C. | 161 | 0.024 | 2.4 |
| 98.0% $Fe_2O_3$ 2.0% $GeO_2$ | 0.031 | 1200°C. | 26.6 | 0.020 | 2.0 |
| 96.5% $Fe_2O_3$ 3.5% $GeO_2$ | 0.054* | 1200°C. | 11.4 | 0.019 | 1.9 |
| 96.0% $Fe_2O_3$ 4.0% $GeO_2$ | 0.062* | 1200°C. | 11.0 | 0.01 | 1.0 |

*See footnote Table I.

I claim:

1. Semiconductive oxides of the hexagonal alpha-$Fe_2O_3$ crystal structure having the formula $Fe_{2-x}Ge_xO_3$, wherein $x$ is in the range 0.0001–0.05.

2. Oxides according to claim 1 wherein $x$ is about 0.05.

3. An electrically conducting shaped ceramic body, having a negative temperature coefficient of resistance, comprising the oxide of claim 1.

4. An electrically conducting shaped ceramic body, having a negative temperature coefficient of resistance, comprising the oxide of claim 2.

5. An electrically conducting shaped ceramic body according to claim 3, additionally comprising unreacted $GeO_2$, wherein the total $GeO_2$ present, in both the semiconductive oxide $Fe_{2-x}Ge_xO_3$ and as unreacted $GeO_2$, is up to about 10% by weight of the total weight of $Fe_{2-x}Ge_xO_3$ and $GeO_2$ present.

6. An electrically conducting shaped ceramic body according to claim 4, additionally comprising unreacted $GeO_2$, wherein the total $GeO_2$ present, in both the semiconductive oxide $Fe_{2-x}Ge_xO_3$ and as unreacted $GeO_2$, is up to about 10% by weight of the total weight of $Fe_{2-x}Ge_xO_3$ and $GeO_2$ present.

7. An electrically conducting shaped ceramic body according to claim 3, additionally comprising unreacted $GeO_2$, wherein the total $GeO_2$ present, in both the semiconductive oxide $Fe_{2-x}Ge_xO_3$ and as unreacted $GeO_2$, is up to about 5% by weight of the total weight of $Fe_{2-x}Ge_xO_3$ and $GeO_2$ present.

8. An electrically conducting shaped ceramic body according to claim 4, additionally comprising unreacted $GeO_2$, wherein the total $GeO_2$ present, in both the semiconductive oxide $Fe_{2-x}Ge_xO_3$ and as unreacted $GeO_2$, is up to about 5% by weight of the total weight of $Fe_{2-x}Ge_xO_3$ and $GeO_2$ present.

* * * * *